(12) United States Patent
Takahashi

(10) Patent No.: US 8,251,114 B2
(45) Date of Patent: Aug. 28, 2012

(54) PNEUMATIC TIRE

(75) Inventor: Yasuhiro Takahashi, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 446 days.

(21) Appl. No.: 12/367,261

(22) Filed: Feb. 6, 2009

(65) Prior Publication Data

US 2009/0211683 A1  Aug. 27, 2009

(30) Foreign Application Priority Data

Feb. 26, 2008 (JP) .................................. 2008-044600

(51) Int. Cl.
*B60C 5/14* (2006.01)

(52) U.S. Cl. ........ 152/511; 152/450; 152/510; 152/526; 152/538; 152/552

(58) Field of Classification Search .................. 152/450, 152/453, 454, 455, 510, 511, 512, 525, 526, 152/538, 539, 548, 552, 553
See application file for complete search history.

(56) References Cited

U.S. PATENT DOCUMENTS

| | | | | |
|---|---|---|---|---|
| 4,744,400 A | * | 5/1988 | Sekoguchi | 152/546 |
| 5,992,486 A | * | 11/1999 | Katsuki et al. | 152/510 |
| 6,062,283 A | * | 5/2000 | Watanabe et al. | 152/510 |
| 6,079,465 A | * | 6/2000 | Takeyama et al. | 152/510 |
| 6,334,919 B1 | * | 1/2002 | Takeyama et al. | 156/123 |
| 6,397,912 B1 | * | 6/2002 | Watanabe et al. | 152/510 |
| 6,398,893 B1 | * | 6/2002 | Shida | 156/130 |
| 7,040,364 B2 | * | 5/2006 | Nakakita et al. | 152/331.1 |
| 7,740,037 B2 | * | 6/2010 | Yamashita | 152/516 |
| 2003/0062105 A1 | * | 4/2003 | Kanenari et al. | 152/517 |
| 2003/0062106 A1 | * | 4/2003 | Kanenari et al. | 152/517 |
| 2004/0194862 A1 | * | 10/2004 | Fukutomi et al. | 152/204 |
| 2004/0198910 A1 | * | 10/2004 | Fukutomi et al. | 525/194 |
| 2005/0205187 A1 | * | 9/2005 | Suzuki | 152/517 |
| 2006/0048877 A1 | * | 3/2006 | Fukutomi et al. | 152/502 |
| 2007/0151653 A1 | * | 7/2007 | Miki et al. | 156/117 |
| 2007/0169871 A1 | * | 7/2007 | Matsuda et al. | 152/531 |
| 2007/0185269 A1 | * | 8/2007 | Fukutomi et al. | 525/192 |
| 2007/0209744 A1 | * | 9/2007 | Matsumura | 152/510 |
| 2008/0078489 A1 | * | 4/2008 | Fukutomi et al. | 152/504 |

FOREIGN PATENT DOCUMENTS

JP  A 8-217922  8/1996

* cited by examiner

*Primary Examiner* — Joseph Del Sole
*Assistant Examiner* — Seyed Masoud Malekzadeh
(74) *Attorney, Agent, or Firm* — Greer, Burns & Crain, Ltd.

(57) ABSTRACT

Provided is a pneumatic tire having an improved driving stability with reduced weight by use of an inner liner layer including a film made of a thermoplastic resin or a thermoplastic elastomer composition obtained by blending a thermoplastic resin with an elastomer. A pneumatic tire of the present invention includes: a pair of bead portions; a carcass layer bridged between the pair of bead portions; a belt layer disposed on an outer circumferential side of the carcass layer; an inner liner layer disposed along an inner surface of the carcass layer, the inner liner layer including a film made of a thermoplastic resin or a thermoplastic elastomer composition that is obtained by blending a thermoplastic resin with an elastomer; and bead cores buried in the bead portions, respectively. The inner liner layer is wound up around the bead cores from an inner side of the tire to an outer side thereof. At least one wound-up part of the inner liner layer extends to a position where the wound-up part overlaps the belt layer.

3 Claims, 2 Drawing Sheets

PNEUMATIC TIRE

BACKGROUND OF THE INVENTION

1. Field of the Invention

The present invention relates to a pneumatic tire in which a film made of a thermoplastic resin or a thermoplastic elastomer composition obtained by blending a thermoplastic resin with an elastomer is used as an inner liner layer. More particularly, the present invention relates to a pneumatic tire having an improved driving stability with reduced weight.

2. Description of the Related Art

Generally, a pneumatic tire has a casing structure including: a carcass layer bridged between a pair of bead portions; and a belt layer disposed on the outer circumferential side of the carcass layer. In addition, the pneumatic tire has an inner liner layer made of a butyl rubber formed along the inner surface of the carcass layer. In order to improve the driving stability of the pneumatic tire by increasing the casing stiffness thereof, it is effective to bury a reinforcing member including organic fiber cords or steel cords in a region from the bead portion to a side wall portion. However, the addition of the reinforcing member that is thickened due to the inclusion of such cords increases the weight of the tire.

On the other hand, a pneumatic tire is proposed in which a thermoplastic resin having an excellent air-permeation prevention ability is used in place of the butyl rubber as the material of an inner liner layer (see, for example, Japanese patent application Kokai publication No. Hei 8-217922). In this case, the thickness of the inner liner layer can be reduced, and thereby the reduction in the tire weight is achieved. However, even in such a pneumatic tire, when a reinforcing member is added to improve the driving stability by increasing the casing stiffness, the tire weight is accordingly increased, canceling out the tire weight reduction caused by the reduced thickness of the inner liner layer.

SUMMARY OF THE INVENTION

An object of the present invention is to provide a pneumatic tire having an improved driving stability with reduced weight by use of an inner liner layer including a film made of a thermoplastic resin or a thermoplastic elastomer composition obtained by blending a thermoplastic resin with an elastomer.

In order to achieve the above object, the pneumatic tire of the present invention includes: a pair of bead portions; a carcass layer bridged between the pair of bead portions; a belt layer disposed on an outer circumferential side of the carcass layer; an inner liner layer disposed along an inner surface of the carcass layer, the inner liner layer including a film made of a thermoplastic resin or a thermoplastic elastomer composition that is obtained by blending a thermoplastic resin with an elastomer; and bead cores buried in the bead portions, respectively. The inner liner layer is wound up around the bead cores from an inner side of the tire to an outer side thereof. At least one wound-up part of the inner liner layer extends to a position where the wound-up part overlaps the belt layer.

In the present invention, since the inner liner layer including the film made of the thermoplastic resin or the thermoplastic elastomer composition is disposed along the inner surface of the carcass layer, the inner liner layer is reduced in thickness, and the tire weight can be reduced in comparison with an inner liner layer made of a butyl rubber. Moreover, the inner liner layer including the film made of the thermoplastic resin or the thermoplastic elastomer composition is wound up around the bead cores from the inner side of the tire to the outer side thereof, and at least one wound-up part of the inner liner layer extends to a position where the wound-up part overlaps the belt layer. Thereby, the driving stability of the tire according to the present invention is improved while the tire weight is reduced. Specifically, the film made of the thermoplastic resin or the thermoplastic elastomer composition has a higher elastic modulus than a film made of a single rubber. Thus, even when the film made of the thermoplastic resin or the thermoplastic elastomer composition is thin, the casing stiffness of the tire is effectively increased. For this reason, even if the number of additional reinforcing members buried in a region from the bead portion to the side wall portion is reduced or if the additional reinforcing members are removed from the tire, an excellent driving stability is provided.

In the present invention, if the tire is designed to be mounted on a vehicle in such a manner that a designated side of the tire faces to the outside of the vehicle, the effect of improving the driving stability is obtained by extending the wound-up part of only the inner liner layer to be located on the outer side of the vehicle to the position where this wound-up part overlaps the belt layer. In the meanwhile, if the tire is not is designed in such a manner, the wound-up parts on both sides of the tire need to extend to the positions where both the wound-up parts overlap the belt layer. It is needless to say that, in the tire that is designed in the manner as above, the wound-up parts of the inner liner layer on both the sides may extend to positions where both the wound-up parts overlap the belt layer.

The overlapping width in a tire width direction between the wound-up part of the inner liner layer and the belt layer is preferably set to 10 mm or more. By setting the overlapping width sufficiently wide, the two films of the inner liner layer are securely laid between the bead core and the belt layer, and effectively increasing the casing stiffness.

Moreover, multiple slits extending in a tire radial direction are preferably provided in the wound-up part of the inner liner layer. To be more specific, if the inner liner layer is excessively stiff, it becomes difficult to expand the cylindrical first green tire built on a making drum in the tire-building step. For this reason, the slits are provided in the wound-up part of the inner liner layer, i.e., in parts which do not provide air-permeation prevention ability. Thereby, the tire-building step is conducted smoothly. It is preferable that the number of slits be 4 to 20, and that the slits be arranged at equal intervals in a tire circumferential direction.

DETAILED DESCRIPTION OF THE PREFERRED EMBODIMENT

Figure 1:
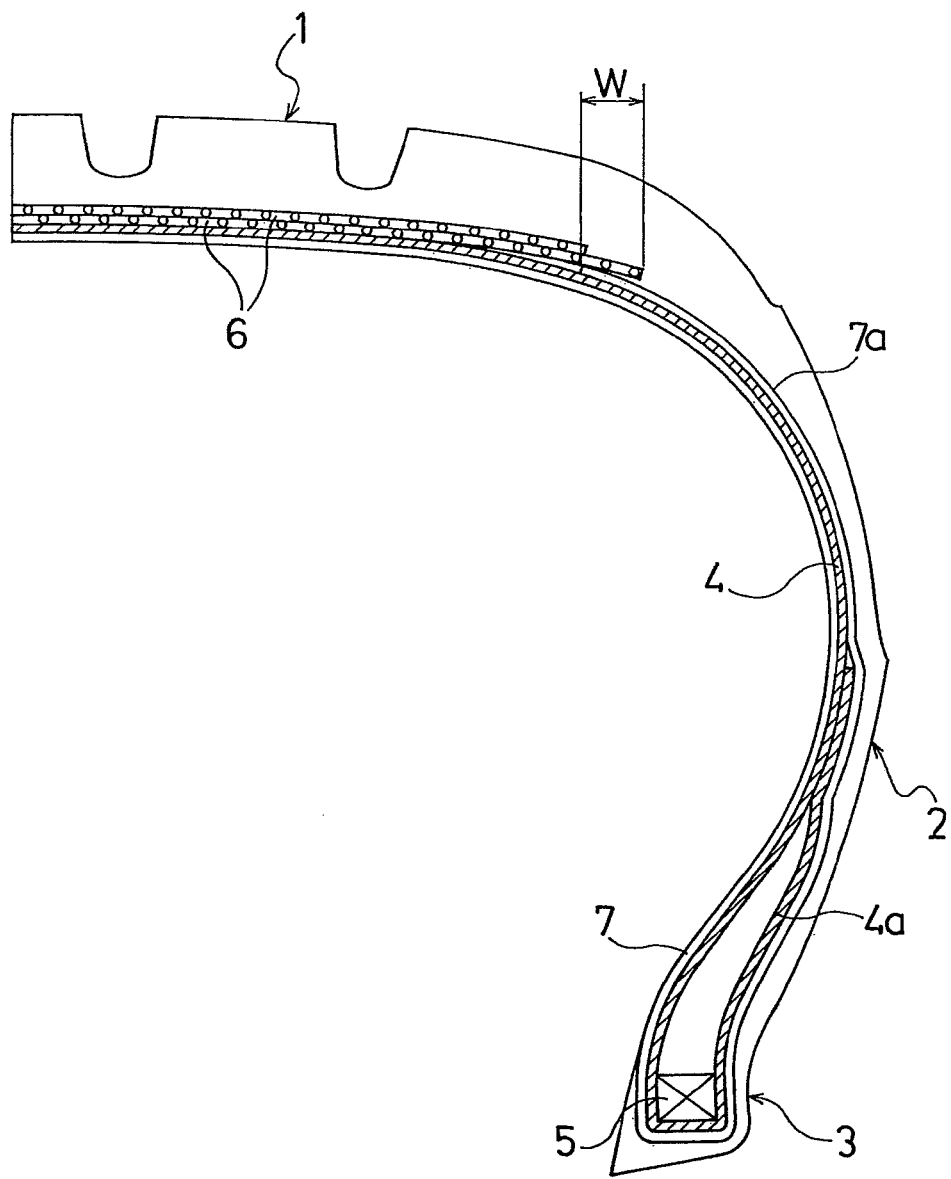
FIG. 1 is a meridian half cross-sectional view of a pneumatic tire according to an embodiment of the present invention.

Hereinafter, a constitution of the present invention will be described in detail with reference to the attached drawings. FIG. 1 shows a pneumatic tire according to an embodiment of the present invention. Reference numeral 1 denotes a tread portion, 2 denotes a side wall portion, and 3 denotes a bead portion. A carcass layer 4 including multiple reinforcing cords is bridged between a right and left pair of the bead portions 3, 3. The carcass layer 4 is wound up around a bead core 5 from the inner side of the tire to the outer side thereof.

As the reinforcing cords in the carcass layer 4, organic fiber cords such as nylon cords or polyester cords are generally used. In the tread portion 1, multiple belt layers 6 are buried on the outer circumferential side of the carcass layer 4. These belt layers 6 are disposed in a way that reinforcing cords of the belt layers 6 incline relative to the tire circumferential direction, and that the reinforcing cords of the respective belt intersect each other.

Furthermore, in the pneumatic tire, an inner liner layer 7 is disposed along the inner surface of the carcass layer 4. The inner liner layer 7 includes a film made of a thermoplastic resin or a thermoplastic elastomer composition. The thickness of the film is not particularly limited, but can be selected from a range of 0.001 mm to 1.000 mm, more preferably 0.005 mm to 0.5 mm. The inner liner layer 7 needs to include the film made of the thermoplastic resin or the thermoplastic elastomer composition. Meanwhile, the inner liner layer 7 may have a thin rubber sheet layered on one side or on both sides of the film.

The inner liner layer 7 is wound-up, as similar to the carcass layer 4, around the bead core 5 from the inner side of the tire to the outer side thereof. A wound-up part 7a of the inner liner layer 7 is disposed over an end of a wound-up part 4a of the carcass layer 4, and extends over there up to a position where the wound-up part 7a overlaps the belt layer 6. Particularly, if a tire is designed to be mounted on a vehicle in such a manner that a designated side of the tire faces to the outside of the vehicle, the tire has at least the wound-up part 7a on the outer side of the vehicle extending to the position where this wound-up part 7a overlaps the belt layer 6. Meanwhile, if a tire is not designed in such a manner, the wound-up parts 7a on both sides of the tire are made to extend to the positions where both the wound-up parts 7a overlap with the belt layer 6.

In the pneumatic tire having the above-described constitution, the inner liner layer 7 including the film made of the thermoplastic resin or the thermoplastic elastomer composition is disposed along the inner surface of the carcass layer 4. Accordingly, the thickness of the inner liner layer 7 can be reduced, thereby allowing the tire to have reduced weight in comparison with a case of an inner liner layer made of a butyl rubber.

Furthermore, the inner liner layer 7 including the film made of the thermoplastic resin or the thermoplastic elastomer composition is wound up around the bead cores 5 from the inner side of the tire to the outer side thereof. At least one of the wound-up parts 7a of the inner liner layer 7 extends to the position where the wound-up part 7a overlaps the belt layer 6. This enables the weight reduction and the driving stability to be balanced. In other words, the film made of the thermoplastic resin or the thermoplastic elastomer composition has a higher elastic modulus than a film made solely of a rubber. Accordingly, even when the film is thin, the casing stiffness of the tire is increased effectively. In general, additional reinforcing members are included in a tire to increase the casing stiffness of the tire. Even when the number of the additional reinforcing members is reduced or when the additional reinforcing members are removed from the tire, the tire can show an excellent driving stability because the inner liner layer 7 including such a film is disposed adjacent to the carcass layer 4. Note that, when the wound-up part 4a of the carcass layer 4 extends to the position where the wound-up part 4a together with the wound-up part 7a of the inner liner layer 7 overlaps the belt layer 6, the casing stiffness of the tire can further be increased.

In the above-described pneumatic tire, an overlapping width W in a tire width direction between the wound-up part 7a of the inner liner layer 7 and the belt layer 6 is set to 10 mm or more. By setting the overlapping width W sufficiently wide, the two films of the inner liner layer 7 are securely laid between the bead core 5 and the belt layer 6, and the casing stiffness can be effectively increased. If the overlapping width W is less than 10 mm, the effect of increasing the casing stiffness is reduced.

Figure 2:
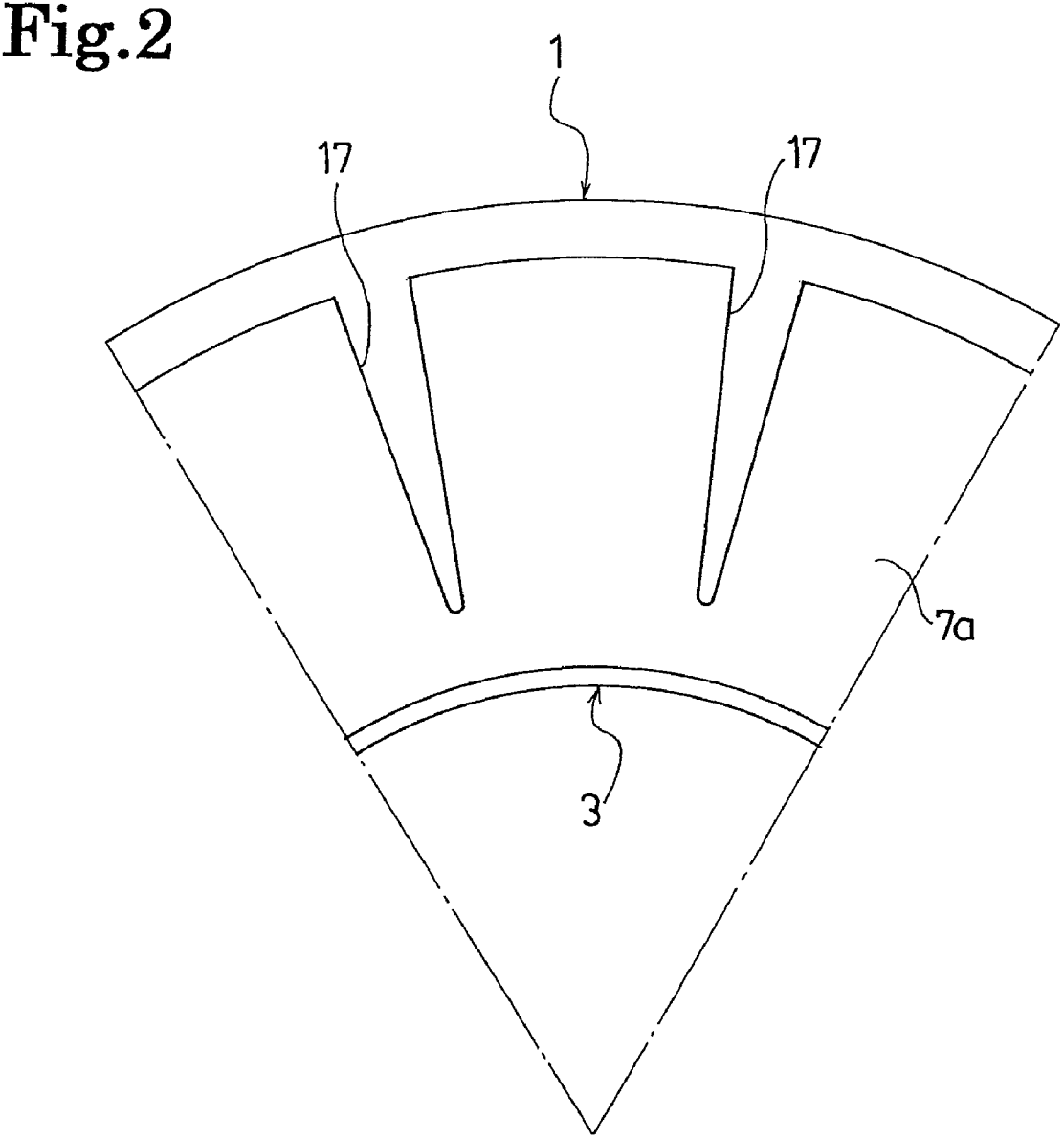
FIG. 2 is a side view showing an extracted wound-up part of an inner liner layer in the pneumatic tire according to the embodiment of the present invention, seen from the side of the tire.

FIG. 2 shows the extracted wound-up part of the inner liner layer in the pneumatic tire, seen from the side of the tire. As shown in FIG. 2, multiple slits 17 extending in a tire radial direction are provided in the wound-up part 7a of the inner liner layer 7. These slits 17 have been formed in an inner liner material wound on a making drum in a tire-building step. In the process of completing the formation of a tire from a cylindrical first green tire, each slit 17 is deformed into a fan-like shape in accordance with the deformation of the carcass layer; that is, the slit 17 is deformed so that the width may gradually increase outwardly in the tire radial direction.

The wound-up part 7a of the inner liner layer 7 greatly contributes to the increase in the casing stiffness of the tire. However, the excessively stiff inner liner layer 7 makes it difficult to expand a cylindrical first green tire build on the making drum in the tire-building step, and tire members may be damaged in some cases. In contrast, when the slits 17 are provided in the wound-up part 7a of the inner liner layer 7, i.e., in parts which do not provide air-permeation prevention ability, the tire-building step can be conducted smoothly.

The number of slits 17 is 4 to 20, and more preferably 6 to 20. It is desirable that these slits 17 be arranged at equal intervals in the tire circumferential direction. The slits 17 preferably extend at an angle of substantially 0° to the tire radial direction. The slits 17 may incline to the tire radial direction as long as an angle of the slits to the tire radial direction is 30° or less. Meanwhile, the slits 17 are desirably formed in a region that is away from the inner edge of the bead core 5 outwardly in the tire radial direction by 5 mm or more. Thereby, the air-permeation prevention ability is attained more surely. Furthermore, the formation region of the slits 17 may be appropriately designed in consideration of, for example, a deformation ratio of a material, which is determined in accordance with the tire size and the like. For example, the slits 17 are desirably formed in a region where an expansion is caused at a state of the completed tire by 20% or more relative to the outer diameter of the inner liner material wound on the making drum.

Hereinafter, description will be given of the film of the inner liner layer used in the present invention. This film can be formed of a thermoplastic resin or a thermoplastic elastomer composition obtained by blending a thermoplastic resin with an elastomer.

Examples of the thermoplastic resin preferably used in the present invention include: polyamide resins (for example, nylon 6 (N6), nylon 66 (N66), nylon 46 (N46), nylon 11 (N11), nylon 12 (N12), nylon 610 (N610), nylon 612 (N612), nylon 6/66 copolymers (N6/66), nylon 6/66/610 copolymers (N6/66/610), nylon MXD6 (MXD6), nylon 6T, nylon 6/6T copolymers, nylon 66/PP copolymers, and nylon 66/PPS copolymers); their N-alkoxyalkylated products (for example, methoxymethylated nylon 6, methoxymethylated nylon 6/610 copolymers, and methoxymethylated nylon 612); polyester resins (for example, aromaticpolyesters, such aspolybutyleneterephthalate (PBT), polyethylene terephthalate (PET), polyethylene isophthalate (PEI), PET/PEI copolymers, polyarylate (PAR), polybutylene naphthalate (PBN), liquid crystal polyester, and polyoxyalkylene diimide diacid/polybutylene terephthalate copolymers); polynitrile resins (for example, polyacrylonitrile (PAN), polymethacrylonitrile, acrylonitrile/styrene copolymers (AS), (meth)acrylonitrile/styrene copolymers, and (meth)acrylonitrile/styrene/butadiene copolymers); polymethacrylate resins (for example, polymethyl methacrylate (PMMA), polyethyl methacrylate); polyvinyl resins (for example, polyvinyl acetate, polyvinyl alcohol (PVA), vinyl alcohol/ethylene copolymers (EVOH), polyvinylidene chloride (PVDC), polyvinyl chloride (PVC), vinyl chloride/vinylidene chloride copolymers, vinylidene chloride/methyl acrylate copolymers, vinylidene chloride/acrylonitrile copolymers); cellulose resins (for example, cellulose acetate, and cellulose acetate butyrate); fluororesins (for example, polyvinylidene fluoride (PVDF), polyvinyl fluoride (PVF), polychlorotrifluoroethylene (PCTFE), and ethylene/tetrafluoroethylene (ETFE) copolymers); and imide resins (for example, aromatic polyimide (PI)).

Examples of the elastomer preferably used in the present invention include: diene rubbers and their hydrogenated products (for example, natural rubbers (NR), isoprene rubber (IR), epoxidized natural rubbers, styrene-butadiene rubber (SBR), butadiene rubbers (BR, high-cis BR and low-cis BR), nitrile rubber (NBR), hydrogenated NBR, and hydrogenated SBR); olefin rubbers (for example, ethylene propylene rubbers (EPDM and EPM), maleic acid-modified ethylene propylene rubber (M-EPM), butyl rubber (IIR), copolymers of isobutylene and aromatic vinyl or diene monomer, acrylic rubber (ACM), and ionomers); halogen-containing rubbers (for example, Br-IIR, Cl-IIR, brominated isobutylene-p-methylstyrene copolymers (Br-IPMS), chloroprene rubber (CR), hydrin rubber (CHR), chlorosulfonated polyethylene rubber (CSM), chlorinated polyethylene rubber (CM), and maleic acid-modified chlorinated polyethylene rubber (M-CM)); silicone rubbers (for example, methyl vinyl silicone rubber, dimethyl silicone rubber, and methylphenylvinyl silicone rubber); sulfur-containing rubbers (for example, polysulfide rubber); fluororubbers (for example, vinylidene fluoride rubbers, fluorine-containing vinyl ether rubbers, tetrafluoroethylene-propylene rubbers, fluorine-containing silicone rubbers, and fluorine-containing phosphazene rubbers); and thermoplastic elastomers (for example, styrene elastomers, olefin elastomers, ester elastomers, urethane elastomers, and polyamide elastomers).

If a particular thermoplastic resin among those described above is incompatible with such an elastomer, a compatibilizer may be used as a third component appropriately to make the two compatible with each other. By mixing such a compatibilizer into the blend system, the interfacial tension between the thermoplastic resin and the elastomer is reduced. As a result, the rubber particles constituting the dispersion phase is made finer, so that both components can exhibit their characteristics more effectively. In general, such a compatibilizer has a copolymer structure of at least one of the thermoplastic resin and the elastomer, or a copolymer structure having an epoxy group, a carbonyl group, a halogen group, an amino group, an oxazoline group, or a hydroxyl group, which is capable of reacting with the thermoplastic resin or the elastomer. The compatibilizer can be selected depending on the type of the thermoplastic resin and the elastomer to be mixed therewith. What is normally used is styrene/ethylene-butylene-styrene block copolymers (SEBS) and their maleic acid-modified products, EPDM, EPM, EPDM/styrene or EPDM/acrylonitrile graft copolymers and their maleic acid-modified products, styrene/maleic acid copolymers, reactive phenoxine, and the like. The blending proportion of such a compatibilizer is not particularly limited, but may preferably be 0.5 to 10 parts by weight relative to 100 parts by weight of the polymer components (the total amount of the thermoplastic resin and the elastomer).

In the thermoplastic elastomer composition, the component ratio of a particular thermoplastic resin to a particular elastomer is not particularly limited, and may be appropriately set so as to have a structure in which the elastomer is dispersed as a discontinuous phase in a matrix of the thermoplastic resin. However, the preferable range is 90/10 to 30/70 in weight ratio.

In the present invention, the thermoplastic resin and the thermoplastic elastomer composition each of which constitutes the film may be mixed with another polymer, for example, the above-described compatibilizer in such an amount that the polymer does not harm the characteristic required as the inner liner layer. The purposes of mixing such a polymer are to improve the compatibility between the thermoplastic resin and the elastomer, to improve the molding processability of the material for the film, to improve the heat resistance, to reduce cost, and so on. Examples of the material used for the polymer include polyethylene (PE), polypropylene (PP), polystyrene (PS), ABS, SBS, and polycarbonate (PC). In addition, afiller (calciumcarbonate, titaniumoxide, alumina, or the like) generally blended with a polymer blend, a reinforcement such carbon black and white carbon, a softner, a plasticizer, a processing aid, a pigment, a dye, an antidegradant, or the like can be blended optionally with the inner liner layer as long as such an agent does not harm the characteristic required as the inner liner layer.

When mixed with the thermoplastic resin, the elastomer can be dynamically vulcanized. A vulcanizer, a vulcanization assistant, vulcanization conditions (temperature, time), and the like, during the dynamic vulcanization can be determined as appropriate in accordance with the composition of the elastomer to be added, and are not particularly limited.

As the vulcanizer, a generally-available rubber vulcanizer (crosslinking agent) can be used. Specifically, examples of a sulfur-based vulcanizer include a sulfur powder, precipitated sulfur, highly dispersible sulfur, surface-treated sulfur, non-soluble sulfur, dimorpholin disulfide, and alkylphenol disulfide. Such a vulcanizer can be used in an amount of, for example, approximately 0.5 to 4 phr (hereinafter, "phr" refers to parts by weight per 100 parts by weight of the elastomer component).

Moreover, examples of an organic peroxide-based vulcanizer include benzoyl peroxide, t-butyl hydroperoxide, 2,4- dichlorobenzoyl peroxide, 2,5-dimethyl-2,5-di(t-butyl peroxy)hexane, and 2,5-dimethylhexane-2,5-di(peroxyl benzoate). Such an organic peroxide-based vulcanizer can be used in an amount of, for example, approximately 1 to 20 phr.

Furthermore, examples of a phenol resin-based vulcanizer includes brominated alkylphenol resins and mixed crosslinking system containing an alkyl phenol resin with a halogen donor such as tin chloride and chloroprene. Such a phenol resin-based vulcanizer can be used in an amount of, for example, approximately 1 to 20 phr.

Examples of other vulcanizers include zinc white (approximately 5 phr), magnesium oxide (approximately 4 phr), litharge (approximately 10 to 20 phr), p-quinone dioxime, p-dibenzoylquinone dioxime, tetrachloro-p-benzoquinone, poly-p-dinitrosobenzene (approximately 2 to 10 phr), and methylenedianiline (approximately 0.2 to 10 phr).

As necessary, a vulcanization accelerator may be added. Examples of the vulcanization accelerator are aldehyde-ammonia-based, guanidine-based, thiazole-based, sulfenamide-based, thiuram-based, dithioic acid salt-based, and thiourea-based vulcanization accelerators which are generally available. Such a vulcanization accelerator can be used in an amount of, for example, approximately 0.5 to 2 phr.

Specifically, an example of the aldehyde-ammonia-based vulcanization accelerator includes hexamethylenetetramine. An example of the guanidine-based vulcanization accelerator includes diphenylguanidine. Examples of the thiazole-based vulcanization accelerator include dibenzothiazyl disulfide (DM), 2-mercapto benzothiazole and their Zn salts, and cyclohexylamine salts. Examples of the sulfenamide-based vulcanization accelerator include cyclohexylbenzothiazyl sulfenamide (CBS), N-oxydiethylenebenzothiazyl-2-sulfenamide, N-t-butyl-2-benzothiazole sulfenamide, and 2-(thymolpolynyldithio)benzothiazole. Examples of the thiuram-based vulcanization accelerator include tetramethylthiuram disulfide (TMTD), tetraethylthiuram disulfide, tetramethylthiuram monosulfide (TMTM), and dipentamethylenethiuram tetrasulfide. Examples of the dithioic acid salt-based vulcanization accelerator include Zn-dimethyldithiocarbamate, Zn-diethyldithiocarbamate, Zn-di-n-butyldithiocarbamate, Zn-ethylphenyldithiocarbamate, Te-diethyldithiocarbamate, Cu-dimethyldithiocarbamate, Fe-dimethyldithiocarbamate, and pipecoline pipecolyldithiocarbamate. Examples of the thiourea-based vulcanization accelerator include ethylene thiourea and diethylthiourea.

Additionally, a vulcanization accelerator assistant which is generally-used for a rubber can be used. For example, zinc white (approximately 5 phr), stearic acid, oleic acid and their Zn salts (approximately 2 to 4 phr), or the like can be used.

The method for producing the thermoplastic elastomer composition is as follows. The thermoplastic resin and the elastomer (unvulcanized one in the case of rubber) are melt-kneaded in advance by a bi-axial kneader/extruder or the like. The elastomer is dispersed as a dispersion phase (domain) in the thermoplastic resin forming a continuous phase (matrix). When the elastomer is vulcanized, the vulcanizer can be added during the kneading process to dynamically vulcanize the elastomer. Although the various compounding agents (except for vulcanizer) may be added to the thermoplastic resin or the elastomer during the kneading process, it is preferable to premix the compounding agents before the kneading process. The kneader used for kneading the thermoplastic resin and the elastomer is not particularly limited. A screw extruder, kneader, Banbury Mixer, bi-axial kneader/extruder, or the like can be used as the kneader. Among these, a bi-axial kneader/extruder is preferably used for kneading the thermoplastic resin and the elastomer and for dynamically vulcanizing the elastomer. Furthermore, two or more types of kneaders can be used to successively knead the thermoplastic resin and the elastomer. As the condition for the melt kneading, the temperature should be at a temperature at which the thermoplastic resin melts or at a higher temperature. The shear rate at the time of kneading is preferably 1000 to 7500 $sec^{-1}$. The overall kneading time is 30 seconds to 10 minutes. When the vulcanizer is added, the vulcanization time after the addition is preferably 15 seconds to 5 minutes. The polymer composition produced by the above method may be formed into a desired shape by a generally-used method for forming a thermoplastic resin such as injection molding and extrusion molding.

The thermoplastic elastomer composition thus obtained has a structure in which the elastomer is dispersed as a discontinuous phase in the matrix of the thermoplastic resin. By adopting such a structure, it becomes possible to provide the inner liner layer with both sufficient flexibility and sufficient stiffness that is attributed to the effect of the resin layer as the continuous phase. Furthermore, it becomes possible to obtain, in molding, a molding processability equivalent to the case of a thermoplastic resin regardless of the amount of elastomer.

The Young's moduli of the thermoplastic resin and the thermoplastic elastomer composition in the standard atmosphere specified by JIS K7100 are not particularly limited, but are preferably set to 1 to 500 MPa, and more preferably 50 to 500 MPa.

The thermoplastic resin or the thermoplastic elastomer composition can be formed into a sheet or film to be used as a single unit. Alternatively, an adhesive layer may be stacked thereon in order to improve the adhesiveness to the adjacent rubber. Specific examples of an adhesive polymer that constitutes the adhesive layer include an ultra high molecular weight polyethylene (UHMWPE) having a molecular weight of 1,000,000 or more, preferably 3,000,000 or more, acrylate copolymers such as ethylene-ethylacrylate copolymers (EEA), ethylene-methylacrylate resins (EMA) and ethylene-acrylic acid copolymers (EAA), and their maleic anhydrate adduct, polypropylene (PP) and maleic acid-modified products thereof, ethylene-polypropylene copolymers and maleic acid-modified products thereof, polybutadiene resins and maleic anhydrate-modified products thereof, styrene-butadiene-styrene copolymers (SBS), styrene-ethylene-butadiene-styrene copolymers (SEBS), thermoplastic fluororesins, and thermoplastic polyester resins. These polymers can be formed into a sheet or film by being extruded with, for example, a resin extruder in accordance with a generally-used method. The thickness of the adhesive layer is not particularly limited, but is preferably small for the tire weight reduction. The thickness of 5 μm to 150 μm is preferable.

Hereinabove, the preferable embodiment of the present invention has been described in detail. It should be understood, however, that various alternations, substitutions and replacements can be made on the above-described embodiment without departing from the spirit and scope of the present invention defined by the attached claims.

EXAMPLES

Tires prepared for Conventional Example, Examples 1, 2 and Comparative Examples 1, 2 were pneumatic tires having the following structures. Specifically, each tire has a tire size of 205/55R16, and includes: a carcass layer bridged between a pair of bead portions; belt layers disposed on the outer circumferential side of the carcass layer; and an inner liner layer disposed along the inner surface of the carcass layer. The pneumatic tires of the respective examples differ from one another in the constituent material of the inner liner layer and in an overlapping width W between wound-up part of the inner liner layer and the belt layer.

The inner liner layer adopted in the tire of Conventional Example was formed of a rubber composition mainly containing a butyl rubber and had a thickness of 1.5 mm; and the inner liner layer is terminated within the inner surface of the tire. The inner liner layer adopted in the tire of Example 1 was formed of a film made of a thermoplastic elastomer composition obtained by blending a thermoplastic resin (nylon 6,66) with an elastomer (brominated butyl rubber) and had a thickness of 0.3 mm; the inner liner layer was wound up around a bead core from the inner side of the tire to the outer side thereof; and the overlapping width between each wound-up part and the belt layer was set to 10 mm. The tire of Example 2 had the same constitution as the tire of Example 1 except that the adopted inner liner layer was formed of a film made of a thermoplastic resin (vinyl alcohol/ethylene copolymer) having a thickness of 0.3 mm. The tire of Comparative Example 1 had the same constitution as the tire of Example 1 except that the adopted inner liner layer is terminated within the inner surface of the tire. The tire of Comparative Example 2 had the same constitution as the tire of Example 2 except that the adopted inner liner layer is terminated within the inner surface of the tire.

The mass, radial stiffness, and transverse stiffness of the tires of Conventional Example, Examples 1, 2 and Comparative Examples 1, 2 were evaluated. The driving stability thereof was evaluated by the following evaluation method. The results are shown in Table 1.

Driving Stability:

Each of the test tires was fitted onto a regular rim, and mounted on a test vehicle. An air pressure of the tire was set to 200 kPa. Then, a feeling evaluation was conducted by a test driver. The evaluation result was expressed by an index where the driving stability of Conventional Example was taken as 100. The larger the index value means the more excellent the tire is in driving stability.

TABLE 1

|  | Conventional Example | Example 1 | Example 2 | Comparative Example 1 | Comparative Example 2 |
| --- | --- | --- | --- | --- | --- |
| Material of inner liner layer | Butyl rubber | Thermoplastic elastomer composition | Thermoplastic resin | Thermoplastic elastomer composition | Thermoplastic resin |
| Overlapping width (mm) | — | 10 | 10 | — | — |
| Mass (kg) | 8.3 | 7.6 | 7.6 | 7.6 | 7.6 |
| Radial stiffness (N/mm) | 202.0 | 203.0 | 203.0 | 202.1 | 202.2 |
| Transverse stiffness (N/mm) | 117.7 | 120.6 | 120.7 | 117.8 | 117.9 |
| Driving stability (index) | 100 | 105 | 105 | 100 | 100 |

As apparent from Table 1, although the tires of Examples 1, 2 had lower weights than that of Conventional Example, the tires of Examples 1, 2 had high radial stiffness, high transverse stiffness, and excellent driving stability. On the other hand, the tires of Comparative Examples 1, 2 also had reduced weights, but the effect of improving the driving stability was not obtained.

What is claimed is:

1. A pneumatic tire comprising:
a pair of bead portions;
a carcass layer bridged between the pair of bead portions;
a belt layer disposed on an outer circumferential side of the carcass layer;
an inner liner layer disposed along an inner surface of the carcass layer, the inner liner layer including a film made of any one of a thermoplastic resin and a thermoplastic elastomer composition that is obtained by blending a thermoplastic resin with an elastomer; and
bead cores buried in the bead portions, respectively,
wherein the inner liner layer is wound up around the bead cores from an inner side of the tire to an outer side thereof, at least one wound-up part of the inner liner layer extends to a position where the wound-up part overlaps the belt layer, and the wound up part of the inner liner layer is beneath the tread portion,
further comprising a plurality of slits provided in the wound-up part of the inner liner layer, the slits extending in a tire radial direction.

2. The pneumatic tire according to claim 1, wherein the wound-up part of the inner liner layer overlaps the belt layer in a tire width direction by 10 mm or more.

3. The pneumatic tire according to claim 1, wherein the number of slits is 4 to 20, and the slits are arranged at equal intervals in a tire circumferential direction.

* * * * *